(12) United States Patent
Habers et al.

(10) Patent No.: US 12,078,513 B2
(45) Date of Patent: Sep. 3, 2024

(54) POSITION SENSING DEVICE FOR HYDRAULIC OR ELECTROHYDRAULIC DRIVES, AND DRIVE HAVING POSITION SENSING MEANS

(71) Applicant: PLEIGER MASCHINENBAU GMBH & CO. KG, Witten (DE)

(72) Inventors: Annika Habers, Bochum (DE); Georg Reska, Witten (DE)

(73) Assignee: PLEIGER MASCHINENBAU GMBH & CO. KG, Witten (DE)

( * ) Notice: Subject to any disclaimer, the term of this patent is extended or adjusted under 35 U.S.C. 154(b) by 165 days.

(21) Appl. No.: 17/997,339

(22) PCT Filed: Apr. 26, 2021

(86) PCT No.: PCT/EP2021/060844
§ 371 (c)(1),
(2) Date: Oct. 27, 2022

(87) PCT Pub. No.: WO2021/219553
PCT Pub. Date: Nov. 4, 2021

(65) Prior Publication Data
US 2023/0220855 A1    Jul. 13, 2023

(30) Foreign Application Priority Data

Apr. 30, 2020   (DE) .................. 10 2020 111 817

(51) Int. Cl.
*G01D 5/14*   (2006.01)
(52) U.S. Cl.
CPC ..................... *G01D 5/14* (2013.01)
(58) Field of Classification Search
CPC ....................................................... G01D 5/14
(Continued)

(56) References Cited

U.S. PATENT DOCUMENTS

| 4,504,832 A | 3/1985 | Conte |
| 7,123,027 B2 * | 10/2006 | Tola ..................... G01D 5/2415 |
| | | 324/662 |

(Continued)

FOREIGN PATENT DOCUMENTS

| DE | 2912913 A1 | 10/1980 |
| DE | 19600687 A1 | 7/1996 |
| WO | 2019111801 A1 | 6/2019 |

OTHER PUBLICATIONS

ISA European Patent Office, International Search Report Issued in Application No. PCT/EP2021/060844, Jul. 30, 2021, WIPO, 2 pages.

*Primary Examiner* — Lam T Mai
(74) *Attorney, Agent, or Firm* — McCoy Russell LLP (57) ABSTRACT

A device for sensing a rotary or linear position of moving parts of drives, in which a moving part performs a rotary movement or a linear positioning movement with respect to a stationary part, has a switch unit comprising switches arranged next to one another in a row and is arranged on the stationary part, and having an actuating element for actuating the switches based on the relative position of the moving part, the actuating element having switch triggers corresponding to the number of switches and each being assigned to the respective switches, such that there is a respectively defined unique combination of positions of the switches for each relative position between the moving part and the stationary part, and a control module having an analysis unit for storing coding for the different switch positions in relation to the relative position of the moving part of the drive.

20 Claims, 3 Drawing Sheets (58) Field of Classification Search
USPC .................................................. 341/1–10
See application file for complete search history.

(56) References Cited

U.S. PATENT DOCUMENTS

| | | | | |
|---|---|---|---|---|
| 7,129,657 B2 * | 10/2006 | Cavarec | ................... | G01D 5/25 |
| | | | | 160/310 |
| 7,448,249 B2 * | 11/2008 | Smith | ................... | G01D 5/165 |
| | | | | 73/1.79 |
| 7,466,487 B2 * | 12/2008 | Miyazaki | ............. | G02B 5/1828 |
| | | | | 359/566 |
| 7,673,667 B2 * | 3/2010 | Domel | ................... | G08C 19/28 |
| | | | | 160/168.1 P |
| 8,283,914 B2 * | 10/2012 | Mehnert | ................ | G01D 5/145 |
| | | | | 324/207.13 |
| 8,428,906 B2 * | 4/2013 | Tosun | ..................... | F02D 41/22 |
| | | | | 702/163 |
| 9,030,194 B2 * | 5/2015 | Dolsak | ................ | G01D 5/24438 |
| | | | | 33/708 |
| 9,121,927 B2 * | 9/2015 | Trujillo | ..................... | G01S 1/76 |
| 9,211,741 B2 * | 12/2015 | Bruno | ................... | B41J 19/205 |
| 9,267,819 B2 * | 2/2016 | Cook | ................... | G01D 5/2275 |
| 9,435,663 B2 * | 9/2016 | Cook | ................... | G01D 5/2455 |
| 9,441,989 B2 * | 9/2016 | Kaiser | ..................... | G01D 5/14 |
| 9,454,138 B2 * | 9/2016 | Grossmann | ........... | G05B 13/021 |
| 9,605,476 B2 * | 3/2017 | Hall | ......................... | F24S 50/80 |
| 9,891,079 B2 * | 2/2018 | Dalvi | ................... | A61B 5/1455 |
| 9,989,986 B2 * | 6/2018 | Foster | .................... | G05G 1/105 |
| 10,451,447 B2 * | 10/2019 | Wang | ................ | G01D 5/34715 |
| 10,502,593 B1 * | 12/2019 | Johnson | ............... | G01D 5/3473 |
| 10,666,171 B2 * | 5/2020 | Odagiri | .................... | H02P 6/16 |
| 10,730,497 B2 * | 8/2020 | Seibert | .................... | B60T 8/326 |
| 10,921,718 B2 * | 2/2021 | Liu | ..................... | G01B 11/002 |
| 10,963,724 B2 * | 3/2021 | Bates | ....................... | G11B 7/09 |
| 11,061,338 B2 * | 7/2021 | Wells | ................. | G03F 7/70341 |
| 11,079,259 B2 * | 8/2021 | Baker | .................. | G01D 5/3473 |
| 11,692,854 B2 * | 7/2023 | Ele | ........................ | G01D 5/3473 |
| | | | | 250/231.18 |
| 11,713,983 B2 * | 8/2023 | Cook | ..................... | G01B 3/205 |
| | | | | 324/207.15 |
| 11,982,549 B2 * | 5/2024 | Grenet | ...................... | G01D 5/38 |
| 2019/0056247 A1 * | 2/2019 | Erlich | .................... | H02K 41/02 |
| 2023/0258600 A1 * | 8/2023 | Frobose | .............. | G01N 27/902 |
| | | | | 324/226 |

* cited by examiner

| Degrees/Drive | Number | 1st Switch | 2nd Switch | 3rd Switch | 4th Switch | 5th Switch |
|---|---|---|---|---|---|---|
| 0,00° | 1 | 1 | 0 | 0 | 0 | 0 |
| 3,09° | 2 | 0 | 0 | 0 | 0 | 0 |
| 6,19° | 3 | 0 | 0 | 0 | 0 | 1 |
| 9,28° | 4 | 0 | 0 | 0 | 1 | 1 |
| 12,38° | 5 | 0 | 0 | 0 | 1 | 0 |
| 15,47° | 6 | 0 | 0 | 1 | 1 | 0 |
| 18,56° | 7 | 0 | 0 | 1 | 1 | 1 |
| 21,66° | 8 | 0 | 0 | 1 | 0 | 1 |
| 24,75° | 9 | 0 | 0 | 1 | 0 | 0 |
| 27,84° | 10 | 0 | 1 | 1 | 0 | 0 |
| 30,94° | 11 | 0 | 1 | 1 | 0 | 1 |
| 34,93° | 12 | 0 | 1 | 1 | 1 | 1 |
| 37,13° | 13 | 0 | 1 | 1 | 1 | 0 |
| 40,22° | 14 | 0 | 1 | 0 | 1 | 0 |
| 43,31° | 15 | 0 | 1 | 0 | 1 | 1 |
| 46,41° | 16 | 0 | 1 | 0 | 0 | 1 |
| 49,50° | 17 | 0 | 1 | 0 | 0 | 0 |
| 52,59° | 18 | 1 | 1 | 0 | 0 | 0 |
| 55,69° | 19 | 1 | 1 | 0 | 0 | 1 |
| 58,78° | 20 | 1 | 1 | 0 | 1 | 1 |
| 61,88° | 21 | 1 | 1 | 0 | 1 | 0 |
| 64,97° | 22 | 1 | 1 | 1 | 1 | 0 |
| 68,06° | 23 | 1 | 1 | 1 | 1 | 1 |
| 71,16° | 24 | 1 | 1 | 1 | 0 | 1 |
| 74,25° | 25 | 1 | 1 | 1 | 0 | 0 |
| 77,34° | 26 | 1 | 0 | 1 | 0 | 0 |
| 80,44° | 27 | 1 | 0 | 1 | 0 | 1 |
| 83,53° | 28 | 1 | 0 | 1 | 1 | 1 |
| 86,63° | 29 | 1 | 0 | 1 | 1 | 0 |
| 89,72° | 30 | 1 | 0 | 0 | 1 | 0 |
| 92,81° | 31 | 1 | 0 | 0 | 1 | 1 |
| 95,91° | 32 | 1 | 0 | 0 | 0 | 1 |
| 0,00° | 1 | 1 | 0 | 0 | 0 | 0 |

Fig. 4

POSITION SENSING DEVICE FOR HYDRAULIC OR ELECTROHYDRAULIC DRIVES, AND DRIVE HAVING POSITION SENSING MEANS

CROSS REFERENCE TO RELATED APPLICATIONS

The present application is a U.S. National Phase of International Application No. PCT/EP2021/060844 entitled "POSITION SENSING DEVICE FOR HYDRAULIC OR ELECTROHYDRAULIC DRIVES, AND DRIVE HAVING POSITION SENSING MEANS," and filed on Apr. 26, 2021. International Application No. PCT/EP2021/060844 claims priority to German Patent Application No. 10 2020 111 817.1 filed on Apr. 30, 2020. The entire contents of each of the above-listed applications are hereby incorporated by reference for all purposes.

TECHNICAL FIELD

The present invention relates to a device for position detection of a rotation position or of a linear position of movable parts of drives, in particular of hydraulic or electrohydraulic drives, which are functionally safe even under extreme ambient conditions like, for example, very low temperatures and in case of a risk of explosion. The position detection means according to the invention relates in particular to hydraulic drives with a movable part which performs a rotation movement or a linear travel movement along a predefined travel path, wherein the rotation position or linear position of the movable part is detected by the device according to the invention as exactly as possible. Such devices for position detection are also designated as sensors or position transmitters for the position of such drives with movable parts, like rotation shafts or drive shafts.

BACKGROUND AND SUMMARY

In the prior art, for example for the detection of rotation positions of such drives or fittings, the use of potentiometers or other sensors continuously detecting the rotation position is known. With such potentiometers, in each case the positions of the movable parts of the drives are continuously detected and output for further processing. For many hydraulic drives, for example for the use of the actuation of doors, ball valves or the like, such potentiometers detecting the complete travel movement are usually used. So they are precise, but also often prone to interference. On the other hand, it is also known to detect in each case only the end position of a travel path of such hydraulic drives with corresponding position end switches, wherein then, the information regarding the relative position in the intermediate positions of the travel path between an initial position and an end position, is missing. This leads to disadvantages and limitations with regard to the control and adjustment of such hydraulically driven valves.

There are also areas of application in which the detection of the position of such movable parts of drives is not possible anymore with the electric potentiometers and often leads to outages and therefore to a very inexact control and adjustment of the drives. For example, at very low temperatures in the polar zone as low as −55° C., hydraulic drives for the actuation of doors, valves or ball valves are usually still fully able to function but they often cannot be adjusted or controlled precisely enough anymore, as the information regarding the relative position of the movable drive parts like shafts or travel rods is missing. The relative position of the movable parts of a rotation shaft for a rotation movement or of a linearly displaceable unit then often cannot be determined accurately enough anymore. At extreme temperatures, differences also often result in the exact position of the movable parts of the drives due to the changing viscosity of the hydraulic oil or the changing ambient conditions. Also in other very difficult ambient conditions, like, for example, a high temperature, risk of explosion or the like and of a combination of these, the usual merely electric position sensors like potentiometers are often not fully functional anymore. Then, on the one hand, outages can occur so that no position detection at all is possible anymore. On the other hand, it can also come to very inexact data in the detection of the rotation position or exact position of a displaceable movable part of the drives, and therefore in wrongly adjusted valves like doors or ball valves, with corresponding resulting damage.

In view of the above, it is the object of the present invention to provide a device for position detection of a rotation position or of a linear position of movable parts of hydraulic or electrohydraulic drives and of such a drive with position detection means by means of which, even in extreme ambient conditions like for example very low temperatures of as low as −55° C., a safe detection and sufficiently exact position determination of the movable parts of the drives in each operating position is allowed. The device according to the invention is furthermore to allow an as exact as possible reproduction of the factual location and position along a travel path, with as little technical effort as possible and in a comparably compact structure.

According to the invention, a device is proposed for position detection of a rotation position or linear position of movable parts of drives, in particular of hydraulic or electrohydraulic drives, which are functionally safe even under extreme ambient conditions, like for example at very low temperatures and in case of a risk of explosion, in which a movable part performs a rotation movement or a linear travel movement in relation to a stationary part, with a switching unit which comprises a plurality of switches arranged adjacent to one another in a row, wherein the switching unit is arranged at the stationary part, and with an actuating member for direct or indirect actuation of the switches of the switching unit depending on the relative position of the movable part, wherein the device is characterised in that the actuating member has a plurality of switch triggers or actuating triggers corresponding to the number of the switches of the switching unit, and that the switch triggers are each allocated to the switches through the juxtaposition and/or arrangement between the movable part and the stationary part, such that in each case a determined, clear combination of switch positions of the switches at each relative position between the movable part and the stationary part is given, and that a control module with an evaluation unit is provided, in which a coding of the different switch positions of the switches in relation to the relative position of the movable part of the drive is stored.

The device of the invention therefore uses a plurality of simple switches of a switching unit, which is in operative connection with oppositely-arranged switch triggers of an actuation member, in order to obtain an as exact as possible position detection even in intermediate positions along a travel path of the drive. The invention therefore offers a quasi-continuous and interference-free position detection for such drives. The switch triggers are arranged such that they can safely switch the different, allocated switches of the switching unit in each case corresponding to a predetermined circuit diagram during displacement of the drive. Hereby, the switch triggers are provided with for example a determined arrangement, contour or shape, so that the different switches in each case are linked with one another in a clear, determined combination of switch positions in each position of the movable part of the drive. The determined clear allocation of the combination of switch positions to the (factual) relative position of the movable part of the drive is stored in a coding according to the invention in a control module, so that on the basis of the different switch positions or of the combination of switch positions, the corresponding factual position of the drive can be detected quite exactly without the necessity of an electric continuous sensor, like of a potentiometer. With the device according to the invention, the detection of a plurality of different positions of the drive by means of the actuation member coupled with the movable part is made possible in a constructionally very simple and robust manner, wherein the actuation member correspondingly switches the switches in each case differently according to the position by means of a corresponding plurality of switch triggers.

By means of the different switch positions, on the basis of the coding stored in the control module the factual location and position can then be determined at a plurality of individual discrete position points of a travel path and with high functional safety. Thus the invention allows a quasi-continuous detection of the relative position of the displaceable movable part of the drive, without a really nonstop continuous measurement in an electrical way with a potentiometer or with other such sensors being provided. The simple use of a series of switches with allocated switch triggers at the actuation member, which cooperate by means of coupled drives with the movable part of the hydraulic drive, is furthermore still functionally safe even in extreme conditions like very low temperatures of, for example, down to −55° C. in the polar region on ships or the like. Also, with the solution according to the invention, a constructionally very simply constructed and relatively compact shape of a fail-safe means for improved position detection is provided. The switching unit and the actuation member can be realised very close to one another with quite small dimensions. The mounting of the device in such drives and valves is therefore facilitated.

Such an allocation according to the invention between the positions of the switches of the switching unit and the relative position of the drive can be either a linear, constant allocation or an allocation which changes along a travel path. For example, the switch triggers of the actuation member can be formed such that along the travel path of the hydraulic drive, position points spaced differently narrowly or further from one another can be detected. For example, the actuation member can be formed with such switch triggers which have a narrower detection sequence at neuralgic, critical points of the displacement of the drive. Such a variant of the invention can be manufactured by way of example in that the switch triggers and the actuation member are coupled with the movable part by means of a not-constant gear. For example, a gear can be replaced by a gear train with constant pitch circle diameter by a varying transmission ratio along the pitch circle diameter, for example by means of eccentrically arranged axes of rotation with regard to the pitch circles of the gear elements. Or, alternatively, different types of coupling gears can be used, in which a resolution of the detection of the travel path in selected ranges is increased or reduced. The switch triggers of the actuating member do not have to be further varied with regard to the arrangement in relation to the switches. With the shape or the arrangement of the actuating member itself, different ranges of the preciseness of a detection of the travel path of the drive can be obtained.

According to an embodiment of the invention, the switches of the switching unit are simple switches with switching function in form of changeover switches or multiple switches. The switches of the switching unit according to the invention are therefore constructionally simply formed switches and in this way very robust and resistant to any kind of interference. Each of the switches can by way of example be realised as a simple changeover switch with a single on-off switch position. Different possibilities result for such switches, by way of example a toggle switch, a push switch or other forms of switches which can be mechanically actuated in a direct manner or also indirectly by means of contact-free switch triggers corresponding to the displacement of the drive. Also according to the invention, simple switches with a multiple switch function with a plurality of switch points in a switch can be used. In this way, the device can be realised even more compactly in the structural shape, as more switch positions and combinations of switch positions for the coded detection of positions of the drive are given in comparison to a changeover switch with merely a simple on-off function.

According to a further embodiment of the invention, the switches are provided with switch areas or switch members for displacing by means of switch triggers in direct contact. The switch triggers can be formed as switch levers, cams of a cam roller or cam track (cam rod), or components realised in other forms, which cooperate with the switch areas or switch members of the switch, which are positioned correspondingly opposite in corresponding shape and position, for the actuating of the switching unit. In this way, an interference-free and functionally safe detection of position, even under extreme external conditions, is possible.

In this respect, according to an alternative further embodiment of the invention, the switches are switches which are actuatable in a contact-free or non-contact manner. The switches can, for example, be provided as so-called Reed contacts, Hall sensors, inductive switches, or capacitive switches. The non-contact actuation has, in determined cases of application, no direct contact is required between the switch triggers of the actuation member and the switches themselves. The switch triggers and the actuation member can therefore also be arranged at a determined distance from the actual switching unit. A mechanical disturbance due to contamination or the like is avoided in this way.

According to a further embodiment of the invention, the actuation member is mechanically directly coupled to the movable part with regard to the travel movement of the drive. The direct mechanical coupling between the actuation member and the movable part of the drive, like for example of a drive shaft or of a drive rod of a hydraulic drive for a fitting, can, for example, take place by means of a corresponding toothed gear connection, a gear, a splined shaft, or similar mechanical coupling means known to the person skilled in the art of the technical field. The device can in this way very exactly detect the corresponding travel path and the position of the drive. For example, on a set travel path between an initial position and an end position, the device can detect the corresponding positions at the respectively provided intermediate positions of the switches by detecting the coding in the control unit by means of the actuation member with the switch triggers. However, the device can also be used alternatively to set a not-limited travel path of a, for example, rotating drive of a rotation shaft for a hydraulic device. With the direct mechanical coupling according to the invention between the actuation member and the moving part of the drive, a very exact detection of the positions in each case can be achieved with simple means without the necessity of completely continuously-measuring electric means such as potentiometers or the like.

According to a further embodiment of the invention, the actuation member is formed in the form of a cam shaft or cam roller, with a plurality of different cams as switch triggers for the different switches with which the cams are in contact. According to the invention, such an actuation of the switches is caused by means of a specific form of cams on a cam roller. The cam shaft or cam roller is therefore formed, for example, in a very compact way with different shapes and a different number of cams. For example, for a first switch and a second switch there can be provided in each case a single cam on a cam roller with an either ON- or OFF-position of the switch over a complete rotation of the cam roller, while for the further third, fourth or fifth switch in each case two, three or even eight cams are formed on a single cam shape in the circumference with correspondingly a plurality of change-overs. Such a cam roller can, according to the invention, generate a plurality of possible position combinations of the switches in a very compact manner. The number of positions for position detection is thereby relatively large. The actuation member is thereby very compact and has very simply formed switch triggers in the form of the differently shaped and arranged number of cams on the cam shaft with a nevertheless quite exact quasi-continuous detection of the movement.

According to a further embodiment of the invention, the switching unit with the plurality of switches is a uniform block, with the plurality of switches aggregated in the block and arranged above one another or adjacent to one another and in each case mounted in determined positions. In this way, so-called combined switching towers or switching units are realised with in each case single switches arranged directly at one another or adjacent to one another. The location and position of the switches is thus securely determined. The switching units can also be easily mounted and exchanged in the case of a defect. It is likewise possible to arrange a plurality of such aggregated switching units as block elements at one and the same movable part of the drive, so that a kind of redundancy in the detection of the position of the drive is made possible. The failure-safety of the position detection is thereby even further increased. The aggregation of the single switches in respective switching units may mean that the mounting and the disassembly are facilitated and a very compact structural shape of the sensor means is made possible.

According to a further embodiment of the invention, the coding of the different switch positions and combination of switch positions of the switches in the control module of the device in relation to the rotation positions or linear positions of the movable part of the drive is stored in the form of a Gray-coding. By means of such a Gray-coding, an allocation of the combination of switch positions of the switches to the respective relative positions of the drive can be stored in a relatively simply formed control. The Gray-coding makes it possible to transfer a plurality of simple binary switch positions of the individual switches to corresponding codings of the factual position of the drive. The Gray-coding can also be easily stored in a storage element of a control unit of the device according to the invention for the respective constructional embodiments of the drive and the corresponding switches of the switching unit. Other types of a coding can also be used in the scope of the present invention, to achieve a clear allocation of the respective travel movement of the drive to the different switch positions or a combination of switch positions of the switches of the switching unit.

According to a further embodiment of the invention, in the control module of the switch positions of the switches, the coding reproduces a quasi-continuous image of different discrete position points of a predefined travel path of the drive. The device therefore allows a quasi-continuous detection of the respective position along a defined travel path. The coding is hereby provided and stored such that corresponding single position points at predetermined positions reproduce the travel path as well as possible and sufficiently exactly for the application in each case. Therefore, a sufficiently reliable and exact replacement for a completely continuous position detection is made available by means of the solution according to the invention. The invention is not limited to simple application areas of such hydraulic drives and can also be used in relatively extreme ambient conditions like very high temperatures, very low temperatures, a risk of explosion and the like, and a combination of these. A predefined travel path according to the invention can for example be a displacement between an initial position and an end position of the drive or of the fitting. In the case of a flap fitting, this would for example be the opening and the closing position of the door.

According to a further embodiment of the invention, the coding in the control module of the device reproduces position points distributed in regular intervals along a predefined travel path of the drive, with regard to the switching positions of the switches. The position points distributed regularly along the travel path are therefore provided relatively regularly in the distances one from the other. Thus a complete, exact image of the travel position in regular distances along the travel path can take place by means of the invention for detecting the factual position of the hydraulic drive.

According to a further embodiment of the invention, the coding of the switching positions of the switches in the control module reproduces varying positions of the movable part of the drive along the travel path of the drive. With such a varying arrangement and reproduction of the position points of the drive, it is possible to realise specific/targeted embodiment of controls and regulations of the drive. For determined applications for example the position adjacent to an endpoint is more relevant than along the initial range of a travel path. At this range, therefore, a more compact arrangement of detection points of the switches is provided. In this way, with the device according to the invention an exactness better adapted to the respective application purpose can be achieved.

A detection exactness, varying along the travel path, of the device according to the invention can, for example, be achieved in that the actuation member is arranged excentrically in the rotation axis during a rotational adjustment. Also, the actuation member can be formed with different types of switch triggers, which allow differently strong trigger moments or release torques of the detection of the travel path at different positions of the travel path. Alternatively, also a non-uniform distribution of switch triggers of the actuation member can be provided.

According to a further embodiment of the invention, an evaluation circuit is stored in the control module of the device, which makes possible an extrapolation of positions of the movable part in relation to the fixed part on the basis of switching positions of the switches detected until then. With such an extrapolation module, in the control module an exact prediction can be achieved even of future positions of the hydraulic drive, without the positions already being reached. With such a module, a kind of forward-looking control and regulation of the drives can be realised, in order to reliably avoid faulty switchings or even damage in the drive.

According to a further embodiment of the invention, two or more switching units with a plurality of respective switches are arranged at a movable part or at an element of the device directly mechanically coupled to the movable part. The device according to this embodiment thus has a plurality of switching units for an even further improved detection of the respective position of the hydraulic drive. With an additional switching unit, a kind of redundancy or double effect is also achieved, so that in the case of a failure of a switch or of a switching unit, the detection is still reliably guaranteed. Such a plural switching unit can achieve a kind of comparison between different switching positions, in order to directly compensate unexactnesses or, in the case of different arrangement, to increase the number of detection points.

According to a further embodiment of the invention, the actuation member has switch triggers for the respective switches on the basis of a non-mechanical actuation technology, in particular of a fluid-technical, electrical or magnetic actuation. Such mechanically not directly done, indirect actuations of the switches by means of the actuation member have additional uses in specific application environments: for example, in the area of environments with greater impacts, oscillations, risk of fire, great heat or electromagnetic radiation, in this way specific applications of the position detection of the hydraulic drives can be achieved which are sufficiently safe and nevertheless can be realised relatively simply in their construction without the requirement of really continuous potentiometers or the like. An indirect, non-mechanical trigger technology can also be required in determined areas, in which the individual parts of the switches and of the switch triggers cannot always come into contact with one another easily in an interference-free manner. In this way, even in such environments, a quasi-continuous position detection according to the invention can be realised.

According to a further embodiment of the invention, the switch triggers of the actuation member, or the switches themselves, comprise a means for friction reduction. This friction reduction means can in particular comprise a roller, a sliding member of also a coating at a contact surface of one of these elements. A long-term interference-free operation of the position detection is possible with reduction of the friction without maintenance being required. The friction reduction furthermore makes a smooth-running triggering of the switches possible. The switches are therefore secure in the respective predefined adjustment positions.

According to a further embodiment of the invention, a mechanical coupling in the form of a gear or in the form of toothed wheels or toothed members is provided between a drive member of the movable part and the actuation member provided at the fixed part. Such a direct mechanical coupling is secure in the transmission of the respective positions between the drive part of the hydraulic drive and the transmission member for the detection of the position by means of the device according to the invention. In this way, the actuation member is coupled directly with the hydraulic drive and its moving part, so that a secure direct transmission of the information regarding the respective current position is guaranteed. An alternative indirect mechanical coupling by means of gears, toothed members or the like is likewise possible.

According to the invention, also a hydraulic or electrohydraulic drive for the actuation of armatures, in particular of doors, ball valves or valves, along a predefined travel path between in particular an opening position and a closing position with a relative movement of a movable part of the drive in relation to a fixed part of the drive is proposed, wherein the drive is characterised in that it comprises a device for position detection of a rotation position or of a linear position for the movable part of the drive.

According to an embodiment of the invention with regard to this, the drive is a hydraulic drive for a rotation movement of rotating armatures like doors, ball valves or valves, wherein the movable part of the drive is a rotating drive shaft and wherein the device for detecting the position is mounted between the drive shaft and a fixed part of the drive.

BRIEF DESCRIPTION OF THE FIGURES

Further features and aspects of the invention are described in more detail in the following by means of different embodiments of the invention with regard to the attached drawings and the Figures included therein, wherein.

DETAILED DESCRIPTION

Figure 1:
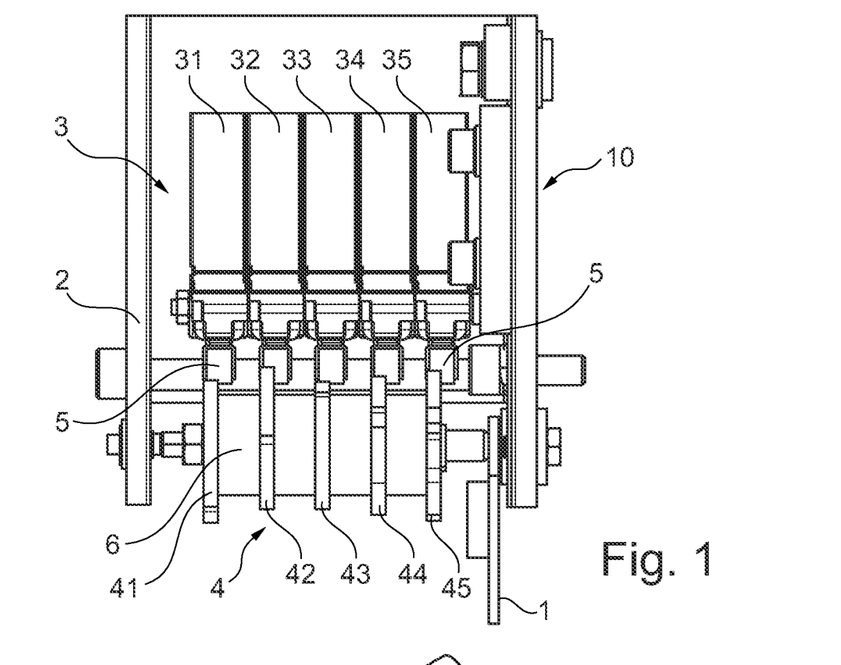
FIG. 1 shows a plan view of an embodiment of a device for position detection according to the invention.
Figure 2:
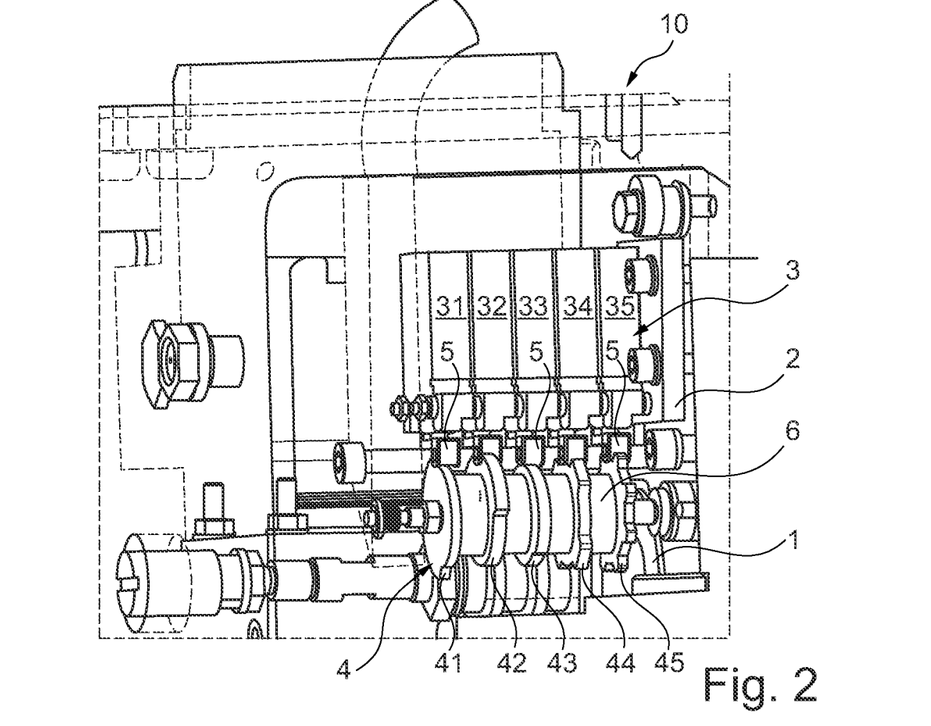
FIG. 2 shows a perspective view of the embodiment of a device for position detection according to the invention according to FIG. 1.

FIG. 1 and FIG. 2 of the drawings show a first embodiment of a device 10 according to the invention for position detection of a rotation position of a hydraulic drive. The device 10 comprises in this embodiment a switching unit 3 with five switches 31, 32, 33, 34, 35, which are contained together in the form of a so-called switching tower or a switching unit. The switching unit 3 is mounted at a fixed part 2, for example a housing part or a flange part of the hydraulic drive. The switching unit 3 is coupled with an actuation member 4 for actuating the switches 31 to 35, wherein the actuation member 4 is directly or indirectly mechanically coupled with the movable part 1 of the hydraulic or electrohydraulic drive. The rotation movement of a control member, like for example a drive shaft of the hydraulic drive, is thereby mechanically converted to the actuation member 4, for example in the form of a toothed wheel combination, a gear ring, a spline shaft or the like. In the case of a displacing of the hydraulic drive the actuation member 4 is actuated therewith corresponding to the travel movement of the drive.

The rotation movement of the movable part 1 (rotation shaft drive) in this embodiment is directly transferred to a type of cam shaft 6 or cam roller through a coupling with the movable part 1 of the drive by means of a large toothed wheel, which is engaged with a smaller toothed wheel at the cam shaft 6. The cam shaft 6 in this embodiment has, corresponding to the number of the switches 31 to 35, five switch triggers 41, 42, 43, 44, 45 or switch actuators which are present in the form of differently shaped cams at the cam shaft 6 at corresponding positions of the switches 31 to 35. The switch triggers 41 to 45 in this embodiment are assembled directly opposite from the switches 31 to 35 of the switching unit 3 and connected mechanically thereto directly by means of a friction-reducing means 5, for example a roller, for switching the switches 31 to 35. During rotating of the actuation member 4 in the shape of this cam shaft 6, the switches 31 to 35 are in each case differently switched on or off, wherein in each position or location of the hydraulic drive a clear combination of switch positions of the switches 31 to 35 is given. The switches 31 to 35 of this embodiment are simple changeover switches, that is, binary switches, so that they have a position either at ON or at OFF.

In this embodiment of the invention, the actuation member 4 in the shape of a cam shaft 6 has differently shaped cams as switch triggers 41 to 45.

While the first two switch triggers 41, 42 each have a single cam along the circumference of the actuation member 4 for actuating the first two switches 31, 32, the third switch trigger 43 is a double cam, the fourth switch trigger 44 is a quadruple cam, and the fifth switch trigger 45 has eight cam projections along the circumference. This also follows from the further representation of the FIG. 3 and FIGS. 3a to 3e, from which these differently shaped switch triggers 41 to 45 of this embodiment of an actuation member 4 for the switching unit 3 can be easily recognised. The switches 31 to 35 of the switching unit 3 in this embodiment are simple changeover switches, which have a fixed, clear switch combination by means of the differently shaped switch triggers 41 to 45 in each rotation position of the rotating part 1 of the hydraulic drive. However, also multiple switches with more than two switch positions could be used. The switches are combined and mounted at the switching unit 3 such that in cooperation with the switch triggers 41 to 45 of the actuation member 4 they each have clear switch combinations in corresponding rotation positions of the movable part 1 of the drive. With each rotation position, the switches 31 to 35 are either switched on or switched off, as this embodiment concerns simple changeover switches. For friction reduction at the switches at the end coming into contact with the actuation member 4, in each case a roller 5 is provided as a friction reducing means. Due to this type of actuation with the actuation member 4, the switches allow a clear determination of the rotation position of the hydraulic drive or electrohydraulic drive in each case, corresponding to a coding as is stored in a control module (not shown), as explained below.

Figure 3:
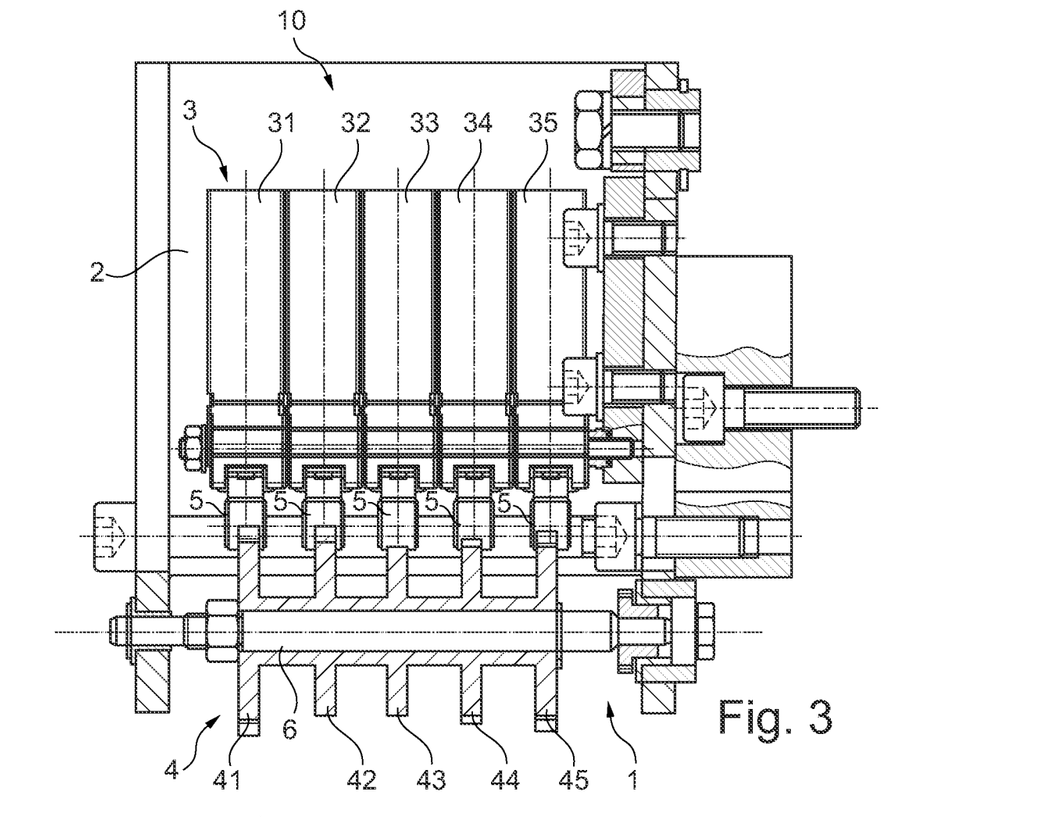
FIG. 3 shows a sectional view of a further embodiment of a device according to the invention for position detection of a rotating position of a hydraulic drive.
Figure 3A:
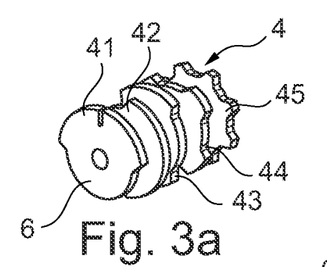
FIG. 3a shows a perspective view of a detail of the actuation member of the position detection device according to FIG. 3.
Figure 3B:
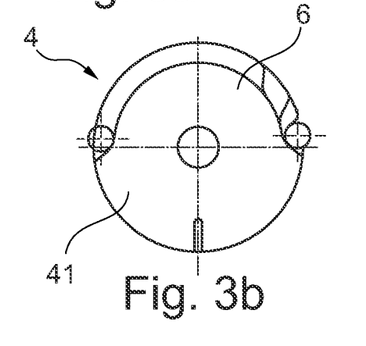
FIG. 3b to FIG. 3e show different sectional views of the cam roller as an example of an actuation member of a position detection device according to the invention according to the embodiment of FIG. 3.
Figure 3C:
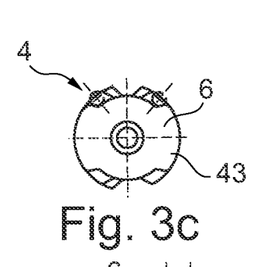
Figure 3D:
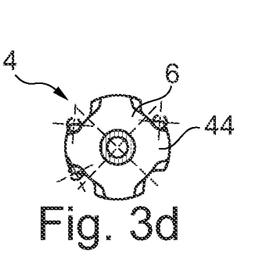
Figure 3E:
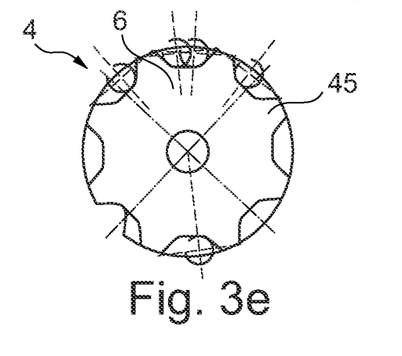
Figure 4:
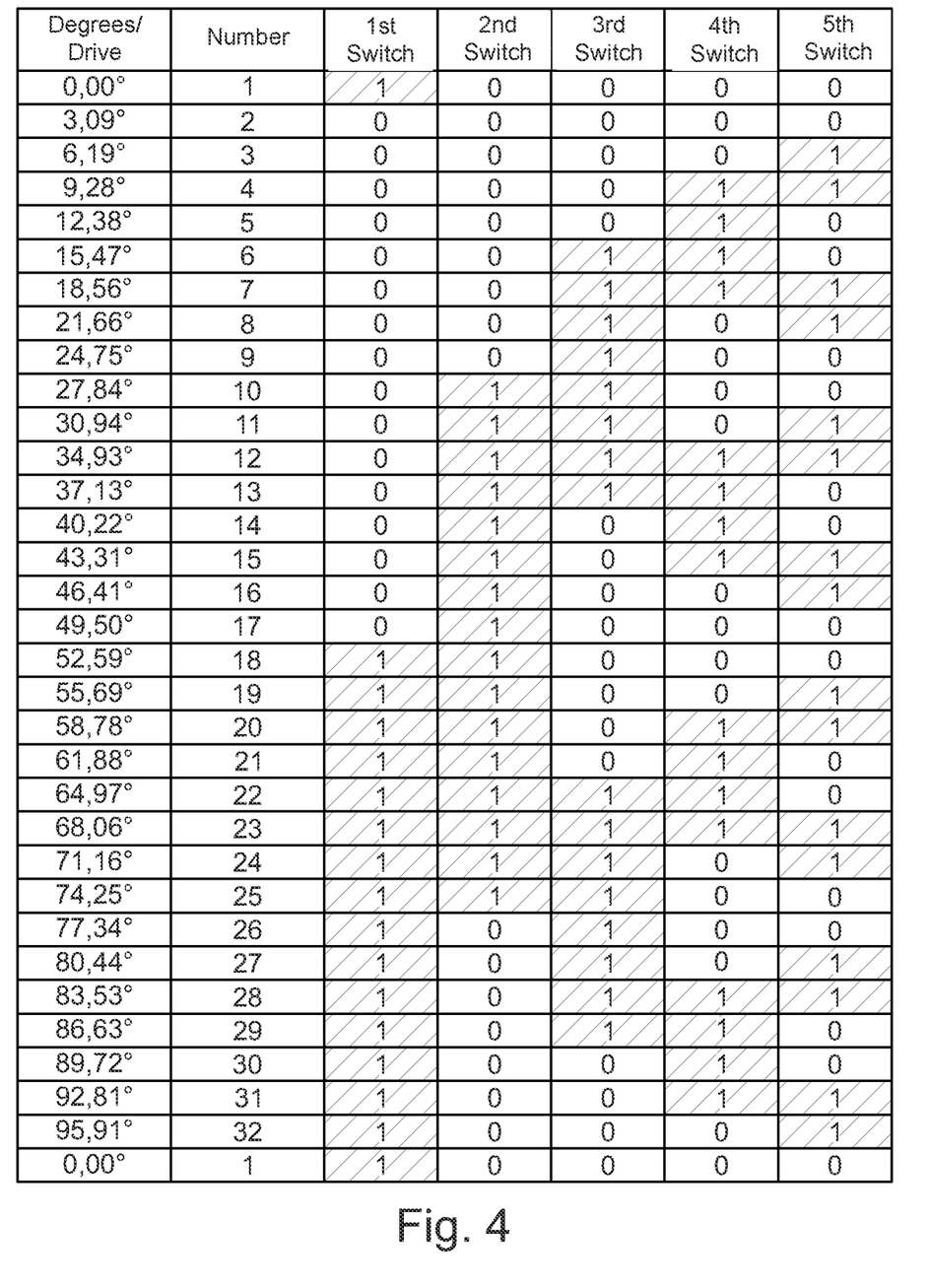
FIG. 4 shows a table of a further embodiment of a position detection device according to the invention for illustrating a coding, stored in a control module, of the switch position combination and of the position of the drive in the form of a Gray-coding.

In FIG. 4, an example of a Gray-coding for the embodiment shown in FIG. 1 to FIG. 3 is represented in the form of a table which is stored in a control module of the device 10. Due to the allocation and arrangement of the actuation member 4 in the shape of the cam shaft 6 or cam roller with differently shaped cam shapes to the five switches 31 to 35, the switches 31 to 35 at each rotation position of 3.09° are actuated in each case clearly differently in combination. Due to the five binary switches, there results a number of altogether $2^5$ (that is, 32) possible signal reports of the control module of the device 10, which represent the corresponding rotation position of the movable part 1 of the hydraulic drive quasi-continuously along the travel path. This is represented in the Gray-coding of the table according to the example of FIG. 4.

The device 10 according to the invention therefore allows a quasi-continuous and fail-safe position detection of a rotating part of a hydraulic drive or electrohydraulic drive, for example of a hydraulic drive for the actuation of a ball valve or the like. Such fittings can also be used under extreme conditions, for example on ships or drilling platforms, which have to make functionally safe operation possible even at very low temperatures for example in the polar region as low as −55° C. Conventional, usual electric potentiometers for detecting the rotation position of rotating drive parts of such hydraulic drives are then no longer usable. They could fail or provide wrong sensor values. To counter this disadvantage, according to the invention the rotation position is quasi-continuously detected by means of a combination of switch positions of the switches 31 to 35 of the switching unit 3. For this, according to the invention special actuation members 4 are present, which reproduce a different but clear combination of switch positions according to the rotation position or linear position of the movable parts 1 of the drive. The switches 31 to 35 in the embodiment shown are simple changeover switches. This concerns an aggregated block or switch tower in the form of a switching unit 3. The number of the switches can also be more than five. Instead of being simple changeover switches with only an ON/OFF-position, the switches 31 to 35 can also be switches with a plurality of switch positions, for example three-way switches or double alternating switches. With such a solution according to the invention, an even larger number of detection points is realisable by means of the coding in the control module. The rollers 5 at the ends of the switches 31 to 35 in the embodiments shown serve the reduction of friction and the safe way of functioning during the actuation with the switch triggers 41 to 45 in the form of the different cams of the cam roller 6 of the actuation member 4. The rollers 5 can, however, also be omitted.

Instead of directly mechanically coupled switches 31 to 35, according to the invention also contact-free switches can be provided, for example Reed contacts, Hall sensors, inductive switches or capacitive switches. For this, correspondingly otherwise formed switch triggers 41 to 45 are provided, which, however, according to the invention are likewise directly or indirectly coupled with the movable part 1 of the drive, for example of a rotation shaft or of a linear rod for displacement of the fitting. Also in such a form of the not direct mechanical coupling with contact-free switches, due to a special coding the allocation of the different positions of the movable part 1 with the plurality of switches 31 to 35 of the switching unit 3 in a control module is determined and securely detected in different extreme ambient conditions.

The device 10 according to the invention for position detection functions safely without operational failures even in the case of extreme situations like very low or very high temperatures, in the case of impacts, oscillations, fire, electromagnetic radiation or the like and guarantees a fail-safe regulation and control of such hydraulic or electrohydraulic drives on the basis of a quasi-continuous detection of the position along a travel path. According to a variant in this respect, at least the electric or electronic component parts of the device 10 are specifically protected in relation to the ambient conditions like fire, impacts, electromagnetic radiation, etc. The electronic component parts and in particular also the control module for the storage of the coding between the switch positions of the switches 31 to 35 of the switching unit 3 and the positions of the travel path of the movable part 1 of the drive can be obtained by means of correspondingly protected casing parts, shields or an arrangement spaced apart from the actual hydraulic drive. In this way, it is prevented that disturbances occur in the operation of the device for detecting the position in such extreme ambient conditions, which can be caused by a failure of individual electronic or electric component parts. In particular, according to the invention the control module with the assessment and the switches 31 to 35 of the switching unit 3 are accordingly specially protected from such extreme outer ambient conditions.

In the embodiments shown in the drawings, the device 10 according to the invention for position detection for the detection of a rotation position of a drive shaft of a hydraulic drive, for example of a door displacement fitting, is shown. The device 10 according to the invention can, however, also be used for the detection of a linear position of a linearly movable part of such a drive. The actuation members 4 are then preferably quasi unwound cam rollers or cam shafts or corresponding cam rods, which cooperate with the corresponding switches on the basis of the arrangement and allocation to the switch triggers 41 to 45 of the actuation member. Or alternatively other switch triggers are used. Also for such an embodiment, by means of a coding stored in a control module the clear allocation of the position to the combination of switch positions of the switches 31 to 35 of the switching unit 3 is guaranteed, in order to detect clear position detections of the drive corresponding to the factual current position and location of the drive part.

Instead of a Gray coding as shown in FIG. 4, other forms of a coding and allocation in a control module between the switch positions of the switches 31 to 35 of the switching unit 3 and of the factual location of the movable part 1 of the drive can be used. The allocation and coding must only be so clearly guaranteed in this embodiment, that each position of the movable part 1 of the drive reflects a clear combination of switch positions of the switches 31 to 35.

With such a coding according to this embodiment of the invention by means of a Gray coding, in each switching point, always only one switch changes its switch position. Position variances of the switches or of the members of the switch by means of, for example, tolerances in the production and in the assembly, bearing clearances, thermal expansion etc. are in this way tolerable and without influence on the measurement result. Other coding systems, in which at the switch point at least two switches change their condition, are in comparison relatively prone to disturbances. However, it is also possible according to the invention to use other forms of codings. A pre-set fixed allocation between the travel path of the movable part of the hydraulic drive and the switching positions of the switches of the switching unit 3 is not absolutely essential according to the invention. It is also possible to provide a kind of learning path or a learning mode in evaluation electronics of the control module. Hereby, for example from a first end position A up to a second end position B the hydraulic drive is displaced with the movable part 1, and the respective allocation of the positions of the switch triggers of the switching unit or of the actuation member 3 to the codings is then correspondingly adapted and stored again. In this way, a merely mechanical and relatively cost-intensive adjustment and alignment of the measuring system can be avoided. Also with such a learning possibility of the control module a variant of the invention is realisable according to which an extrapolation to not-yet detected adjustment positions is made more easily possible.

The actuation by means of the switch triggers 41 to 45 of the actuation member 4 can also take place indirectly in a non-mechanical way. For example, these are thinkable: electric or fluid-technical actuations of the switches in form of a type of remote control or of an otherwise formed actuation of the switches 31 to 35. These specific embodiments of the invention can be particularly useful in extreme ambient conditions. However, the mechanical direct coupling via an actuation member 4 which has switch triggers 41 to 45 which directly trigger the switches 31 to 35, is to be preferred in many cases of application.

The form and shape of the cams as switch triggers 41 to 45 of the cam shaft 6 can be represented differently than shown in the embodiments. For example, the cams can have a differently formed rounding-off of the elevation and recess. Also, instead of being cams, the switch triggers 41 to 45 can be simple projections, recesses or protrusions which cooperate with corresponding members at the switches 31 to 35 for a switching-over of the switches of the switching unit 3.

The invention claimed is:

1. A device for detecting a position of a rotation position or linear position of movable parts of drives which are functionally safe under extreme ambient conditions like at very low temperatures and in case of risk of explosion, wherein a movable part performs a rotation movement or a linear travel movement in relation to a stationary part, with a switching unit which comprises a plurality of switches arranged in a row adjacent to one another, wherein the switching unit is arranged at the stationary part, and with an actuating member for direct or indirect actuation of the plurality of switches of the switching unit depending on a relative position of the movable part of a drive,
wherein
the actuating member has a plurality of switch triggers corresponding to the plurality of switches of the switching unit, and
that the plurality of switch triggers are each allocated to the plurality of switches through a setting in a row and/or arrangement between the movable part and the stationary part, such that in each case a determined, clear combination of switch positions of the plurality of switches at each relative position between the movable part and the stationary part is given,
and
that a control module with an evaluation unit is provided, in which there is stored a coding of different switch positions of the plurality of switches in relation to the relative position of the movable part of the drive.

2. The device according to claim 1, wherein the plurality of switches are switches with a simple switch function in the form of changeover switches or multiple switches.

3. The device according to claim 1, wherein the plurality of switches are provided with switch areas or switch members for displacement by means of the plurality of switch triggers in direct contact.

4. The device according to claim 1, wherein the plurality of switches are switches actuatable in a contact-free manner or non-contact switches.

5. The device according to claim 1, wherein the actuating member is mechanically directly coupled with the movable part with regard to a travel movement of the drive.

6. The device according to claim 5, wherein the actuating member as the plurality of switch triggers comprises a number of different cams on a cam roller, which are in contact with the plurality of switches.

7. The device according to claim 1, wherein the switching unit is a uniform block with the plurality of switches mounted above one another or adjacent to one another in predetermined positions.

8. The device according to claim 1, wherein the coding of the switch positions of the plurality of switches with regard to rotation positions or linear positions of the movable part of the drive is stored in the control module in form of a Gray-coding.

9. The device according to claim 1, wherein the coding of the switch positions of the plurality of switches in the control module represents a quasi-continuous image of different discrete position points of a predefined travel path of the drive.

10. The device according to claim 1, wherein the coding of the switch positions of the plurality of switches in the control module displays position points distributed in regular distances over a predefined travel path of the drive.

11. The device according to claim 9, wherein the coding of the switch positions of the plurality of switches in the control module represents positions varying over the predefined travel path of the drive, at a travel path of the movable part of the drive.

12. The device according to claim 5, wherein in the control module an evaluation circuit is stored, which makes possible an extrapolation from a position of the movable part in relation to the stationary part based on previously detected switch positions of the plurality of switches.

13. The device according to claim 1, wherein at least two switching units are arranged with the plurality of switches in each case at the movable part or at a member of the device mechanically coupled directly with the movable part.

14. The device according to claim 12, wherein the actuating member has the plurality of switch triggers based on a non-mechanical trigger technology.

15. The device according to claim 5, wherein the plurality of switch triggers of the actuating member or the plurality of switches comprise a means for friction reduction.

16. The device according to claim 5, wherein a mechanical coupling in form of a gear, toothed element or of toothed wheels is provided between a drive member of the movable part and the actuating member located at the stationary part.

17. A hydraulic or electrohydraulic drive for actuation of fittings over a predefined travel path between an opening position and a closing position with a relative movement of the movable part of the drive in relation to the stationary part, wherein the device for detecting the position of the rotation position or of the linear position is provided for the movable part of the hydraulic or electrohydraulic drive according to claim 1.

18. The hydraulic or electrohydraulic drive according to claim 17, wherein the hydraulic or electrohydraulic drive is a hydraulic drive for rotation movements of rotating fittings like doors, ball valves or valves, wherein the movable part of the hydraulic or electrohydraulic drive is a rotating drive shaft and that the device is mounted between the rotating drive shaft and the stationary part of the drive.

19. The device according to claim 14, wherein the non-mechanical trigger technology is fluid-technological, electrical or magnetic actuation.

20. The device according to claim 15, wherein the plurality of switch triggers of the actuating member or the plurality of switches comprise a roller or a sliding member for friction reduction.

* * * * *